United States Patent Office 2,812,282
Patented Nov. 5, 1957

2,812,282

STABILIZED AQUEOUS SOLUTION OF NITROFURAZONE

Victor R. Ells, Norwich, N. Y., assignor to The Norwich Pharmacal Company, Norwich, N. Y., a corporation of New York No Drawing. Application November 14, 1955,
Serial No. 546,814

7 Claims. (Cl. 167—53.1)

This invention relates to veterinary preparations and aims to provide an aqueous solution of nitrofurazone (5-nitro-2-furaldehyde semicarbazone) which is stabilized against deterioration through contact with galvanized iron.

Nitrofurazone is a highly effective therapeutic agent in the treatment of coccidial infections of poultry. In minute doses the drug is an excellent prophylactic agent and in larger doses it is an excellent curative agent in combatting coccidiosis. In the past, it has been the practice to administer nitrofurazone to pultry by admixing it with poultry feed. Concentrations of the order of 1 part of nitrofurazone per 9,000 parts of feed produce curative results in established coccidial infections, whereas concentrations of 1 part of nitrofurazone per 18,000 parts of feed provide effective prophylactic treatment.

While admixture of nitrofurazone with poultry feed has proved generally to be an effective method of administering the drug to poultry, it would be easier to accomplish this result if the drug could be ingested with the drinking water supplied to the birds. Also, sick chickens, for instance, tend to consume subnormal amounts of feed so that the administration of effective doses of nitrofurazone admixed with feed may, in such cases, prove difficult. However, even though sick birds may not eat as much feed as usual, their water consumption ordinarily is maintained at a constant level so that nitrofurazone dissolved in the birds' drinking water would be administered to them at a sufficiently constant rate.

Although nitrofurazone is only very slightly soluble in water (1:4200), its potency as a drug in combatting coccidiosis is such that a concentration of nitrofurazone in water within the range of about 0.0035% to about 0.011% in drinking water supplied to poultry has proved to be effective in treating coccidial infections. However, past attempts to administer nitrofurazone to poultry by dissolving it in their drinking water have been unsuccessful because nitrofurazone in aqueous solution is quite unstable in the presence of galvanized iron. The drinking troughs which are normally used on poultry farms are composed of galvanized iron and the concentration of nitrofurazone in aqueous solution when placed in such a container soon becomes so low that water consumed thereafter by birds does not contain a sufficiently high concentration of nitrofurazone to provide an effective dose of the drug.

I have discovered that it is possible to stabilize nitrofurazone in aqueous solution against deterioration in the presence of galvanized iron by adding to the solution either sodium dichromate or potassium dichromate. The addition of either of those compounds, in very small amounts, to an aqueous solution of nitrofurazone will produce an excellent stabilizing effect and no toxic manifestations have been observed as a result of their use as such stabilizing agents.

In the practice of my invention, I prefer to use an aqueous solution of nitrofurazone wherein the nitrofurazone concentration is about 0.0067% (1:15,000). As little as 0.0001% sodium dichromate dissolved in drinking water having 0.0067% nitrofurazone dissolved therein stabilizes that nitrofurazone to the extent that, when the solution is placed in a galvanized iron vessel, about 80% of the amount of nitrofurazone initially present remains after 24 hours have elapsed. When the concentration of sodium dichromate is of the order of 0.01%, a stabilizing effect of the order of about 96% after 24 hours and about 94% after 48 hours is produced.

The stabilizing effect of sodium dichromate upon an aqueous solution of nitrofurazone in a galvanized iron container is shown by the following table:

Table 1

AQUEOUS SOLUTIONS CONTAINING 0.0067% NITROFURAZONE

| Percent Sodium Dichromate Added | Percent Nitrofurazone Remaining | | |
|---|---|---|---|
| | 6 hrs. | 24 hrs. | 48 hrs. |
| 0.01 | 98.7 | 96.5 | 94.0 |
| 0.0067 | 97.0 | 91.4 | 86.4 |
| 0.004 | 97.7 | 93.0 | 89.2 |
| 0.003 | 98.0 | 96.0 | 88.0 |
| 0.002 | 97.2 | 93.5 | 86.0 |
| 0.001 | 94.5 | 90.0 | 78.0 |
| 0.00067 | 95.8 | 90.4 | 78.8 |
| 0.00033 | 92.6 | 86.0 | 71.6 |
| 0.0001 | 90.0 | 81.8 | 62.8 |
| 0.0000 (control) | 73.8 | 43.2 | 8.4 |

While nitrofurazone and the dichromate salts which I use in the practice of my invention are completely soluble in water at the concentrations employed, I find that admixture is facilitated if they are first incorporated in a concentrate. Such concentrate can be easily distributed to poultry farmers and is readily mixed by them in the drinking water supply of their poultry as needed. Such concentrate may be dispensed in liquid or powdered form, for instance. Illustrative examples of such concentrates are as follows:

EXAMPLE I

| | Parts |
|---|---|
| Nitrofurazone | 3.4 |
| Sodium dichromate | 0.34 |
| N,N dimethylformamide | 96.26 |

The drug, nitrofurazone, and the stabilizing agent, sodium dichromate, are dissolved in the carrier, N,N dimethylformamide, to provide a concentrate which will dissolve readily and completely in water. One tablespoon (15 ml.) of that concentrate added to two gallons of water provides a solution containing about 0.0067% nitrofurazone, an effective drug concentration, and about 0.00067% sodium dichromate, a stabilizing quantity. The above concentrate is a completely stable composition.

EXAMPLE II

| | Parts |
|---|---|
| Nitrofurazone | 10.00 |
| Potassium dichromate | 1.00 |
| Lactose | 189.00 |
| Sodium lauryl sulfate | 0.75 |

The above ingredients are mixed to form a powder which comprises, as intimately dispersed particles of micron size, the drug, nitrofurazone, the stabilizing agent, potassium dichromate, an inert carrier, lactose, and a wetting agent, sodium lauryl sulfate. Such a powder is a completely stable composition and is formulated so that, when two teaspoons are dissolved in about one gallon of water, a prophylactic solution of nitrofurazone results. The stability of such a solution is shown by the following table:

Table II

| | Percent Nitrofurazone Remaining | | | |
|---|---|---|---|---|
| | 6 hrs. | 24 hrs. | 48 hrs. | 96 hrs. |
| Powder | 98 | 99 | 99 | 90 |
| Control (no stabilizer) | 73.8 | 43.2 | 8.4 | |

What I claim is:

1. An aqueous solution of nitrofurazone stabilized against deterioration from contact with galvanized iron and adapted for use in the treatment of coccidiosis in poultry, containing from about 0.0035 to about 0.011% of nitrofurazone and a stabilizing agent comprising from about 0.0001 to about 0.01% of a compound selected from the group consisting of sodium dichromate and potassium dichromate.

2. An aqueous solution of nitrofurazone stabilized against deterioration from contact with galvanized iron and adapted for use in the treatment of coccidiosis in poultry, containing from about 0.0035 to about 0.011% of nitrofurazone and a stabilizing agent comprising from about 0.0001 to about 0.01% of sodium dichromate.

3. An aqueous solution of nitrofurazone stabilized against deterioration from contact with galvanized iron and adapted for use in the treatment of coccidiosis in poultry, containing from about 0.0035 to about 0.011% of nitrofurazone and a stabilizing agent comprising from about 0.0001 to about 0.01% of potassium dichromate.

4. An aqueous solution of nitrofurazone stabilized against deterioration from contact with galvanized iron and adapted for use in the treatment of coccidiosis in poultry, containing about 0.0067% of nitrofurazone and a stabilizing agent comprising about 0.00067% of a compound selected from the group consisting of sodium dichromate and potassium dichromate.

5. A veterinary preparation comprising a concentrate adapted for use in the preparation of an aqueous solution of nitrofurazone stabilized against deterioration from contact with galvanized iron, containing from about 3.4 to about 10 parts of nitrofurazone, a stabilizing agent comprising from about 0.34 to about 1.0 part of a compound selected from the group consisting of sodium dichromate and potassium dichromate and a carrier therefor.

6. A veterinary preparation comprising a concentrate adapted for use in the preparation of an aqueous solution of nitrofurazone stabilized against deterioration from contact with galvanized iron, containing about 3.4 parts of nitrofurazone, about 0.34 part of sodium dichromate and about 96.26 parts of N,N dimethylformamide.

7. A veterinary preparation comprising a concentrate adapted for use in the preparation of an aqueous solution of nitrofurazone stabilized against deterioration from contact with galvanized iron, containing about 10.0 parts of nitrofurazone, about 1.0 part of potassium dichromate, about 189.0 parts of lactose and about 0.75 part of sodium lauryl sulfate.

No references cited.